United States Patent
Matsumura et al.

(10) Patent No.: US 11,864,191 B2
(45) Date of Patent: Jan. 2, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 492 days.

(21) Appl. No.: 17/268,744

(22) PCT Filed: Aug. 17, 2018

(86) PCT No.: PCT/JP2018/030570
§ 371 (c)(1),
(2) Date: Feb. 16, 2021

(87) PCT Pub. No.: WO2020/035949
PCT Pub. Date: Feb. 20, 2020

(65) Prior Publication Data
US 2021/0329685 A1    Oct. 21, 2021

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01)

(58) Field of Classification Search
CPC ............................ H04W 72/23; H04L 5/0048
See application file for complete search history.

(56) References Cited

U.S. PATENT DOCUMENTS

| | | | | |
|---|---|---|---|---|
| 10,560,243 | B2* | 2/2020 | Bai | ............ H04L 27/2688 |
| 11,483,780 | B2* | 10/2022 | Fu | ............ H04L 27/26025 |
| 2020/0196332 | A1* | 6/2020 | Yokomakura | ......... H04L 5/0048 |
| 2021/0337548 | A1* | 10/2021 | Gao | ................. H04W 72/0453 |

FOREIGN PATENT DOCUMENTS

WO    2018/143405 A1    8/2018

OTHER PUBLICATIONS

Extended European Search Report issued in European Application No. 18930213.6 dated Mar. 11, 2022 (14 pages).
Ericsson, "Feature lead summary 1 of PT-RS", 3GPP TSG RAN WG1 Meeting #93, R1-1807658, Busan, Korea, May 21-25, 2018 (17 pages).

(Continued)

*Primary Examiner* — Chandrahas B Patel
(74) *Attorney, Agent, or Firm* — Osha Bergman Watanabe & Burton LLP

(57) ABSTRACT

A user terminal according to one aspect of the present disclosure includes: a transmitting/receiving section that receives or transmits a shared channel based on fallback Downlink Control Information (DCI); and a control section that makes a given assumption on a density of a Phase Tracking Reference Signal (PTRS) of the shared channel scheduled by the fallback DCI. According to one aspect of the present disclosure, it is possible to appropriately determine a PTRS density.

5 Claims, 7 Drawing Sheets

(56) References Cited

OTHER PUBLICATIONS

Huawei, HiSilicon, "Discussion on NR UE PDSCH demodulation performance requirements under fading propagation conditions", 3GPP TSG RAN meeting #87, R4-1807910, Busan, Korea, May 21-25, 2018 (11 pages).

Office Action issued in Indian Application No. 202137005549; dated Dec. 8, 2022 (7 pages).

Notice of Reasons for Refusal issued in Japanese Application No. 2020-537352 dated Sep. 13, 2022 (10 pages).

NTT Docomo, Inc., "Remaining details on PT-RS", 3GPP TSG RAN WG1 Meeting #92, R1-1802477, Athens, Greece, Feb. 26-Mar. 2, 2018 (5 pages).

International Search Report issued in Application No. PCT/JP2018/030570, dated Nov. 6, 2018 (5 pages).

Written Opinion issued in International Application No. PCT/JP2018/030570, dated Nov. 6, 2018 (5 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

3GPP TSG RAN WG1 Meeting #93; R1-1806154; "Remaining issues on PT-RS;" Panasonic; May 21-25, 2018; Busan, Korea (6 pages).

3GPP TSG RAN WG1 Meeting #93; R1-1806226; "Remining issues on PT-RS;" Ericsson; May 21-25, 2018; Busan, Korea (5 pages).

3GPP TSG RAN WG1 Meeting #93; R1-1807197; "Further comments on PT-RS;" Nokia, Nokia Shanghai Bell; May 21-25, 2018; Busan, Korea (7 pages).

3GPP TS 38.214 V15.2.0, Release 15; "3rd Generation Partnership Project; Technical Specification Group Radio Access Network; NR; Physical layer procedures for data;" Jun. 2018; Sophia Antipolis Valbonne, France (7 pages).

* cited by examiner

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (LTE Rel. 8 and 9), LTE-Advanced (LTE-A and LTE Rel. 10 to 14) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 15 or subsequent releases) are also studied.

In legacy LTE systems (e.g., LTE Rel. 8 to 14), a user terminal (UE: User Equipment) controls reception of a physical downlink shared channel (e.g., PDSCH: Physical Downlink Shared Channel) based on Downlink Control Information (also referred to as, for example, DCI or a DL assignment) from a base station. Furthermore, the user terminal controls transmission of a physical uplink shared channel (e.g., PUSCH: Physical Uplink Shared Channel) based on DCI (also referred to as, for example, a UL grant).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR) that a base station and a UE transmit Phrase Tracking Reference Signals (PTRSs). According to study on NR conducted so far, a PTRS density is determined based on a higher layer parameter.

However, in a case where a legacy PTRS density determination method is used, there is a problem that there is a difference between recognitions of a PTRS density assumed by the base station and the UE when a higher layer reconfiguration signal is notified to the UE. Unless this problem is dealt with, there is a risk that a communication throughput lowers.

It is therefore one of objects of the present disclosure to provide a user terminal and a radio communication method that can appropriately determine a PTRS density.

Solution to Problem

A user terminal according to one aspect of the present disclosure includes: a transmitting/receiving section that receives or transmits a shared channel based on fallback Downlink Control Information (DCI); and a control section that makes a given assumption on a density of a Phase Tracking Reference Signal (PTRS) of the shared channel scheduled by the fallback DCI.

Advantageous Effects of Invention

According to one aspect of the present disclosure, it is possible to appropriately determine a PTRS density.

DESCRIPTION OF EMBODIMENTS

Figure 1:
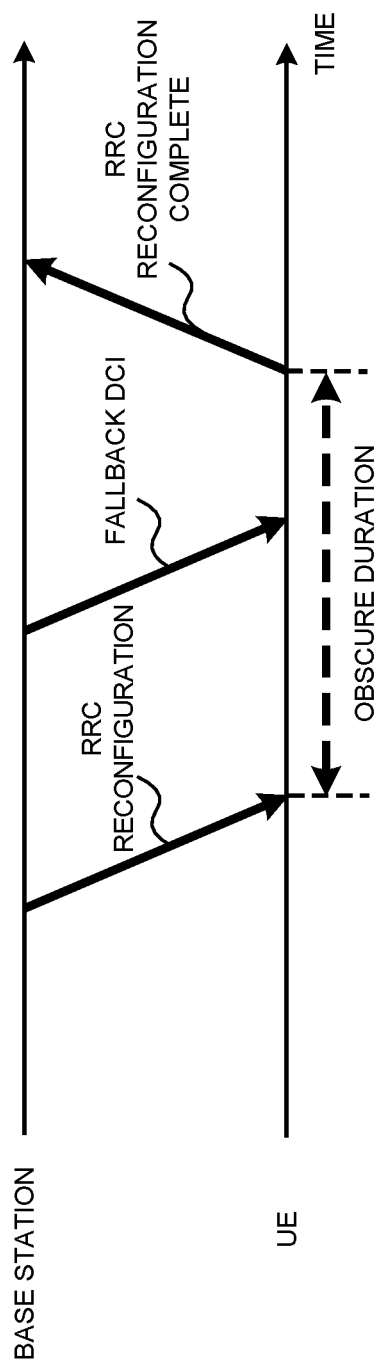
FIG. 1 is a diagram illustrating one example of an obscure duration of an RRC parameter relative to RRC reconfiguration.

According to NR, a base station (e.g., gNB) may transmit a Phase Tracking Reference Signal (PTRS) on downlink. The base station may contiguously or non-contiguously map PTRSs on a given number of (e.g., one) subcarriers in a time direction to transmit.

A UE may receive the PTRS in at least part of a duration (a slot or a symbol) in which a downlink shared channel (PDSCH: Physical Downlink Shared Channel) is scheduled (in other words, a duration in which the PDSCH is received). The PTRS transmitted by the base station may be referred to as a DL PTRS.

Furthermore, the UE may transmit a Phase Tracking Reference Signal (PTRS) on uplink. The UE may contiguously or non-contiguously map PTRSs on a given number of (e.g., one) subcarriers in the time direction to transmit.

The UE may transmit the PTRS in at least part of a duration (a slot or a symbol) in which an uplink shared channel (PUSCH: Physical Uplink Shared Channel) is scheduled (in other words, a duration in which the PUSCH is transmitted). The PTRS transmitted by the UE may be referred to as a UL PTRS.

In the present disclosure, the PTRS may be read as at least one of the DL PTRS and the UL PTRS.

The base station or the UE may determine a phase noise based on the received PTRS, and correct a phase error of a received signal (e.g., the PUSCH or the PDSCH).

PTRS configuration information (PTRS-DownlinkConfig for DL and PTRS-UplinkConfig for UL) may be configured to the UE by using a higher layer signaling. For example, the PTRS configuration information may be included in configuration information (DMRS-DownlinkConfig or DMRS-UplinkConfig) of a Demodulation Reference Signal (DMRS) of the PDSCH or the PUSCH.

In this regard, the higher layer signaling may be one or a combination of, for example, a Radio Resource Control (RRC) signaling, a Medium Access Control (MAC) signaling and broadcast information.

The MAC signaling may use, for example, an MAC Control Element (MAC CE) or an MAC Protocol Data Unit (PDU). The broadcast information may be, for example, a Master Information Block (MIB), a System Information Block (SIB), Remaining Minimum System Information (RMSI) or Other System Information (OSI).

The PTRS configuration information may include information (e.g., a "timeDensity" field of an RRC parameter) used to determine a PTRS time density. The information may be referred to as time density information. The time density information may indicate, for example, a threshold (e.g., at least one of ptrs-$MCS_1$, ptrs-$MCS_2$, ptrs-$MCS_3$ and ptrs-$MCS_4$) related to a below-mentioned time density.

The PTRS configuration information may include information (e.g., a "frequencyDensity" field of an RRC parameter) used to determine a PTRS frequency density. The information may be referred to as frequency density information. The frequency density information may indicate, for example, a threshold (e.g., at least one of $N_{RB0}$ and $N_{RB1}$) related to a below-mentioned frequency density.

Different values may be configured to the PTRS configuration information for the DL PTRS and the UL PTRS. Furthermore, the PTRS configuration information may be configured to the UE per Bandwidth Part (BWP) in a cell, or may be configured commonly between BWPs (i.e., cell-specific).

When the PTRS configuration information is not configured (notified) to the UE (e.g., before RRC connection), the UE may assume that a PTRS is not present (the PTRS is not included in a signal to be transmitted or received). When the PTRS configuration information is configured (notified) to the UE (e.g., after RRC connection), the UE may determine a PTRS pattern (at least one of the time density and the frequency density) based on detected Downlink Control Information (DCI).

When at least one of the time density information and the frequency density information is configured to the UE, and a Radio Network Temporary Identifier (RNTI) used to scramble a Cyclic Redundancy Check (CRC) of DCI is a specific RNTI (e.g., a Cell-RNTI (C-RNTI) or a Configured Scheduling RNTI (CS-RNTI)), the UE may assume the presence of an antenna port of the PTRS, and determine the PTRS pattern based on an MCS (scheduled MCS) and a bandwidth (scheduled bandwidth) that are scheduled by the DCI.

In addition, DCI for specifying a PTRS density may be fallback DCI, or may be non-fallback DCI.

In this regard, the fallback DCI may be, for example, DCI that is transmitted in at least one of a Common Search Space (C-SS) and a UE-specific Search Space (UE-SS), and DCI to which a configuration (such as contents and a payload) cannot be configured by a UE-specific higher layer signaling (RRC signaling). The fallback DCI may be used before RRC connection.

The fallback DCI for scheduling a PDSCH may be referred to as a DCI format 1_0, and the fallback DCI for scheduling a PUSCH may be referred to as a DCI format 0_0.

One Search Space (SS) may be associated with PDCCH candidates corresponding to one or a plurality of Aggregation Levels (ALs). One or a plurality of SSs may be referred to as an SS set. In addition, a "search space", a "search space set", a "search space configuration" and a "search space set configuration" in the present disclosure may be interchangeably read.

In addition, the fallback DCI may be DCI to which a configuration (contents and a payload) can be configured by a UE-common higher layer signaling (e.g., broadcast information or system information).

The non-fallback DCI may be, for example, DCI that is transmitted in the UE-SS, and may be DCI to which a configuration (contents and a payload) can be configured by a UE-specific higher layer signaling (e.g., RRC signaling). The fallback DCI may be used after RRC connection.

The non-fallback DCI for scheduling a PDSCH may be referred to as a DCI format 1_1, and the non-fallback DCI for scheduling a PUSCH may be referred to as a DCI format 0_1.

The UE may determine an MCS index ($I_{MCS}$) based on a Modulation and Coding Scheme (MCS) field of DCI, and determine a PTRS time density $L_{PT-RS}$ based on this $I_{MCS}$ and a threshold related to the above-described time density.

For example, the UE may determine $L_{PT-RS}$ as follows:

In a case of $I_{MCS}$<ptrs-$MCS_1$, the UE assumes that a PTRS is not present,

In a case of ptrs-$MCS_1 \leq I_{MCS}$<ptrs-$MCS_2$, $L_{PT-RS}=4$ holds,

In a case of ptrs-$MCS_2 \leq I_{MCS}$<ptrs-$MCS_3$, $L_{PT-RS}=2$ holds, and

In a case of ptrs-$MCS_3 \leq I_{MCS}$<ptrs-$MCS_4$, $L_{PT-RS}=1$ holds.

A correspondence between the MCS indices and the PTRS time densities is not limited to this. For example, the number of thresholds may be smaller or larger than four. In addition, a value of $L_{PT-RS}$ may indicate that, when the value is smaller, the density is higher, and may indicate, for example, arrangement intervals of PTRS symbols.

The UE may determine the number of resource blocks ($N_{RB}$) scheduled based on a frequency domain resource allocation field of DCI, and determine a PTRS frequency density $K_{PT-RS}$ based on this $N_{RB}$ and a threshold related to the above-described frequency density.

For example, the UE may determine $K_{PT-RS}$ as follows:

In a case of $N_{RB}$<$N_{RB0}$, the UE assumes that a PTRS is not present,

In a case of $N_{RB0} \leq N_{RB}$<$N_{RB1}$, $K_{PT-RS}=2$ holds, and

In a case of $N_{RB1} \leq N_{RB}$, $K_{PT-RS}=4$ holds

A correspondence between scheduled bandwidths and the PTRS frequency densities is not limited to this. For example, the number of thresholds may be smaller or larger than two. In addition, a value of $K_{PT-RS}$ may indicate that, when the value is smaller, the density is higher, and may indicate, for example, arrangement intervals of PTRS subcarriers.

When the time density information is not configured to the UE, the UE may assume that $L_{PT-RS}$ is a given value (e.g., 1). When the frequency density information is not configured to the UE, the UE may assume that $K_{PT-RS}$ is a given value (e.g., 2). In addition, given values related to $L_{PT-RS}$ and $K_{PT-RS}$ may be determined in advance or may be configured by a higher layer signaling.

While RRC is reconfigured after RRC connection is established, the base station cannot know when the UE has switched the RRC parameter (a reconfigured RRC parameter has become valid).

It is preferred that the UE can receive a PDSCH and transmit a PUSCH without depending on the RRC parameter in a duration during RRC reconfiguration. In this case, use of fallback DCI is assumed.

However, according to study on NR conducted so far, the PTRS density is determined as described above based on an RRC parameter (a threshold related to a time density or a threshold related to a frequency density) irrespectively of fallback DCI and non-fallback DCI. A problem in this case will be described by using FIG. 1.

FIG. 1 is a diagram illustrating one example of an obscure duration of an RRC parameter relative to RRC reconfiguration. Until the UE transmits RRC reconfiguration complete information (e.g., RRCReconfigurationComplete message) after receiving RRC reconfiguration information (e.g., RRCReconfiguration message) (in an obscure duration illustrated in FIG. 1), the base station cannot specify when to validate (update) an RRC parameter included in the RRC reconfiguration information.

When the RRC reconfiguration information includes at least one of the time density information and the frequency density information, and the UE receives the fallback DCI or the non-fallback DCI in the obscure duration, it is supposed that a PTRS density associated with scheduling of DCI is either one of density information before update and density information after update.

Hence, when a legacy PTRS density determination method is used, there is a problem that there is a difference between recognitions of a PTRS density assumed by the base station and the UE during RRC reconfiguration, and therefore transmission and reception of a PDSCH or a PUSCH cannot be appropriately performed and fail. Unless this problem is dealt with, there is a risk that a communication throughput lowers.

Hence, the inventors of the present invention have conceived a method that can appropriately determine a PTRS density during reconfiguration even when an RRC parameter is reconfigured.

Embodiments according to the present disclosure will be described in detail below with reference to the drawings. A radio communication method according to each embodiment may be each applied alone or may be applied in combination.

(Radio Communication Method)

First Embodiment

According to the first embodiment, a UE may assume that a PTRS is not present on a shared channel scheduled by fallback DCI.

When, for example, a PDSCH is scheduled by a DCI format 1_0 transmitted in a C-SS, the UE may assume that the PDSCH does not include a PTRS.

When a PUSCH is scheduled by a DCI format 0_0 transmitted in the C-SS, the UE may assume that the PUSCH does not include a PTRS.

According to the above-described first embodiment, the UE can determine that a PTRS is not present even during RRC reconfiguration by using the fallback DCI without depending on an RRC parameter, so that it is possible to appropriately transmit and receive a shared channel.

Second Embodiment

According to the second embodiment, a UE may assume that one or both of a PTRS time density $L_{PT-RS}$ and frequency density $K_{PT-RS}$ are each a specific density (a specific value or a fixed value) on a shared channel scheduled by fallback DCI.

When, for example, a PDSCH is scheduled by a DCI format 1_0 transmitted in a C-SS, the UE may assume $L_{PT-RS}=1$ and $K_{PT-RS}=2$ when receiving the PDSCH.

When a PUSCH is scheduled by a DCI format 0_0 transmitted in the C-SS, the UE may assume $L_{PT-RS}=1$ and $K_{PT-RS}=2$ when transmitting the PUSCH.

The UE may assume the highest density among densities that can be configured by a higher layer signaling as a time density or a frequency density that is assumed in a case of the fallback DCI. In this case, it is expected that a PTRS for scheduling based on the fallback DCI can be associated with a great phase noise.

The UE may assume the lowest density among densities that can be configured by a higher layer signaling as the time density or the frequency density that is assumed in a case of the fallback DCI. In this case, it is possible to suppress (reduce) an increase in a code rate of data (a PDSCH or a PUSCH) scheduled based on the fallback DCI.

According to the second embodiment, the UE may assume that part or all of a threshold (e.g., above-described ptrs-$MCS_1$) related to the PTRS time density and a threshold (e.g., above-described $N_{RB0}$) related to the frequency density are each a specific value (fixed value) on a shared channel scheduled by the fallback DCI.

According to the above-described second embodiment, the UE can determine a PTRS density even during RRC reconfiguration by using the fallback DCI without depending on an RRC parameter, so that it is possible to appropriately transmit and receive a shared channel.

Third Embodiment

According to the third embodiment, a UE assumes that at least one of an MCS index and a scheduled bandwidth indicated by fallback DCI is a specific value (or is within a range of the specific value). That is, according to the third embodiment, a base station restricts at least one of the MCS index and the scheduled bandwidth indicated by the fallback DCI to the specific value (or to the range of the specific value).

For example, the UE may assume that a shared channel scheduled by the fallback DCI transmitted in a C-SS corresponds to at least one of an MCS index and the number of resource blocks whose PTRS is not present (the base station instructs at least one of these MCS index and number of resource blocks).

That is, the UE may assume that $I_{MCS}$ indicated by the fallback DCI corresponds to $I_{MCS}<$ptrs-$MCS_1$ at all times, and a PTRS is not present on the shared channel scheduled by the fallback DCI. Furthermore, the UE may assume that $N_{RB}$ indicated by the fallback DCI corresponds to $N_{RB}<N_{RB0}$ at all times, and a PTRS is not present on the shared channel scheduled by the fallback DCI.

The UE may assume that a shared channel scheduled by DCI that does not make it possible to assume that a PTRS is not present (e.g., DCI that clearly indicates that a PTRS is present) may not be demodulated, or may assume that the shared channel may not be transmitted.

The UE may assume that one or both of a PTRS time density $L_{PT-RS}$ and frequency density $K_{PT-RS}$ are each a specific density (a specific value or a fixed value) on a shared channel scheduled by DCI that does not make it possible to assume that a PTRS is not present (e.g., DCI that clearly indicates that a PTRS is present) (i.e., the above second embodiment may be applied).

In addition, that "a PTRS is not present" in the third embodiment may be read as that "a PTRS has a specific density".

<Others>

The assumption described in each of the above-described embodiments may be applied under a specific condition.

A UE may apply one of the assumptions of the first to third embodiments to a specific band. For example, the UE may assume that a PTRS is not present on a shared channel scheduled by fallback DCI in a band of a first frequency range (FR 1: Frequency Range 1) according to the first embodiment, and assume that a PTRS of a specific density is present on a shared channel scheduled by fallback DCI in a band of a second frequency range (FR 2: Frequency Range 2) according to the second embodiment.

In addition, the FR 1 may be a frequency range (sub-6 GHz) equal to or less than 6 GHz, and the FR 2 may be a frequency range (above-24 GHz) higher than 24 GHz. The frequency ranges and definitions of the FR 1 and the FR 2 are not limited to these.

When a PTRS cannot be used, characteristics deterioration due to a phase noise is a problem in the FR 2 in particular. However, by changing an assumption on a PTRS of the fallback DCI per band, it is possible to suppress such deterioration.

Furthermore, when the UE supports given capability related to a PTRS (e.g., the UE can/cannot transmit or receive a PTRS of a given density) or reports that the UE supports the given capability, the UE may apply one of the assumptions of the first to third embodiments. When, for example, supporting the given capability related to the PTRS, the UE may assume that a PTRS of a specific density is present on a shared channel scheduled by fallback DCI according to the second embodiment.

The above embodiments have been described on a premise that the PTRS of the shared channel scheduled by the fallback DCI is assumed at all times. However, the assumption may be validated only in a specific duration. For example, even in a case of a shared channel scheduled by fallback DCI, when a transmission/reception timing is outside the specific duration, a base station and the UE may determine a PTRS density according to an RRC parameter (a threshold related to a time density or a threshold related to a frequency density).

For example, the base station may assume that, for a certain duration after an RRC reconfiguration signaling including PTRS configuration information is transmitted to the UE (e.g., until an RRC reconfiguration complete signaling is received from the UE), the UE determines the PTRS density based on at least one of the assumptions of the above-described embodiments.

For example, for a certain duration after receiving the RRC reconfiguration signaling including the PTRS configuration information from the base station (e.g., until transmitting the RRC reconfiguration complete signaling), the UE may determine the PTRS density based on at least one of the assumptions of the above-described embodiments.

In addition, the fallback DCI in each of the above embodiments may be read as other pieces of DCI (e.g., non-fallback DCI).

(Radio Communication System)

The configuration of the radio communication system according to one embodiment of the present disclosure will be described below. This radio communication system uses one or a combination of the radio communication method according to each of the above embodiments of the present disclosure to perform communication.

Figure 2:
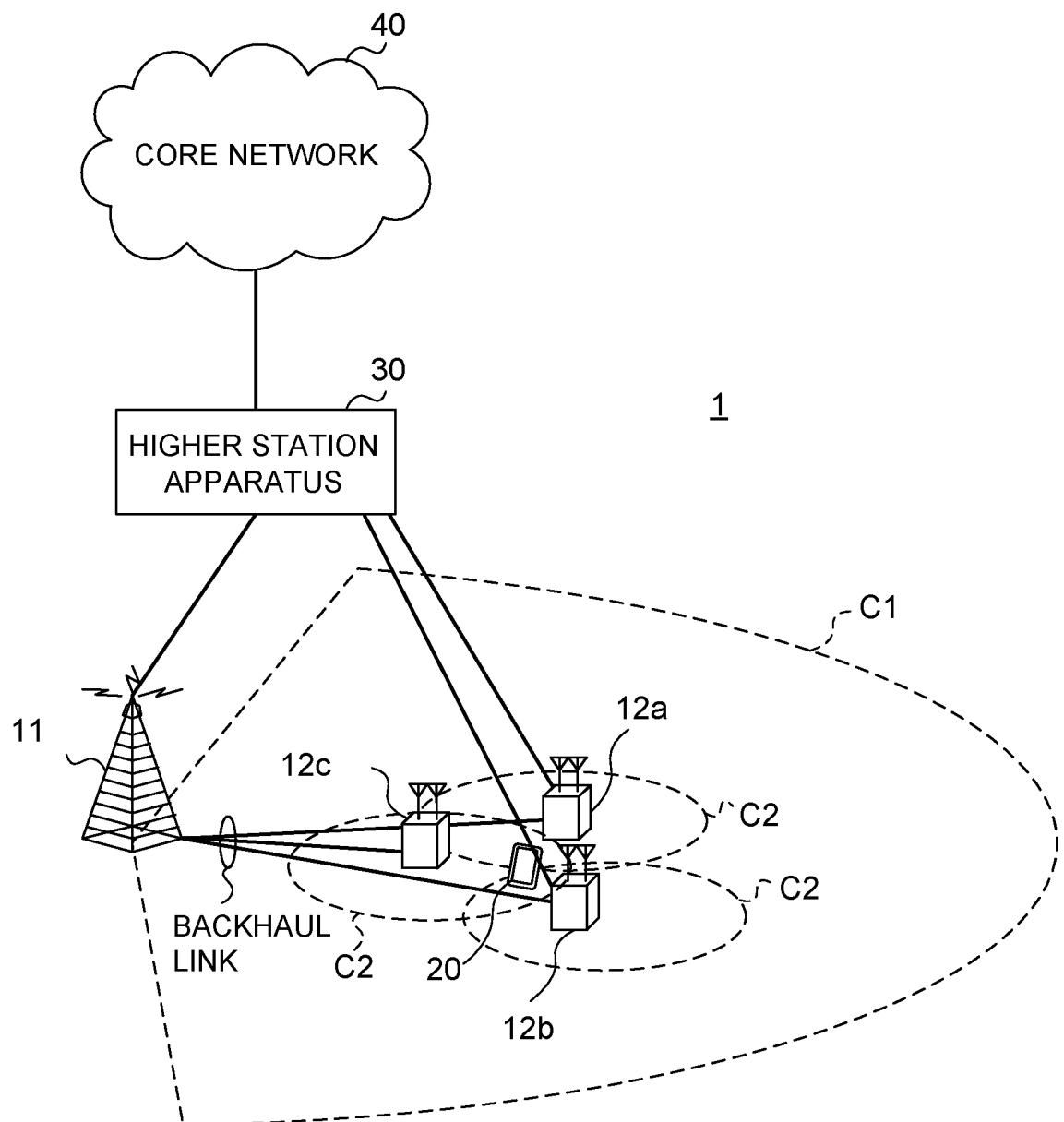
FIG. 2 is a diagram illustrating one example of a schematic configuration of a radio communication system according to one embodiment.

FIG. 2 is a diagram illustrating one example of a schematic configuration of the radio communication system according to the one embodiment. A radio communication system 1 can apply at least one of Carrier Aggregation (CA) and Dual Connectivity (DC) that aggregates a plurality of base frequency blocks (component carriers) whose 1 unit is a system bandwidth (e.g., 20 MHz).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

Furthermore, the radio communication system 1 may support dual connectivity between a plurality of Radio Access Technologies (RATs) (Multi-RAT Dual Connectivity (MR-DC)). MR-DC may include, for example, dual connectivity of LTE and NR (EN-DC: E-UTRA-NR Dual Connectivity) where a base station (eNB) of LTE (E-UTRA) is a Master Node (MN), and a base station (gNB) of NR is a Secondary Node (SN), and dual connectivity of NR and LTE (NE-DC: NR-E-UTRA Dual Connectivity) where a base station (gNB) of NR is an MN, and a base station (eNB) of LTE (E-UTRA) is an SN.

The radio communication system 1 includes a base station 11 that forms a macro cell C1 of a relatively wide coverage, and base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 2.

The user terminal 20 can connect with both of the base station 11 and the base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the base station 11 can communicate by using a carrier (also referred to as a legacy carrier) of a narrow bandwidth in a relatively low frequency band (e.g., 2 GHz). On the other hand, the user terminal 20 and each base station 12 may use a carrier of a wide bandwidth in a relatively high frequency band (e.g., 3.5 GHz or 5 GHz) or may use the same carrier as that used between the user terminal 20 and the base station 11. In this regard, a configuration of the frequency band used by each base station is not limited to this.

Furthermore, the user terminal 20 can perform communication by using at least one of Time Division Duplex (TDD) and Frequency Division Duplex (FDD) in each cell. Furthermore, each cell (carrier) may be applied a single numerology or may be applied a plurality of different numerologies.

The numerology may be a communication parameter to be applied to at least one of transmission and reception of a certain signal or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain.

For example, a case where at least ones of subcarrier spacings of constituent OFDM symbols and the numbers of OFDM symbols are different on a certain physical channel may be read as that numerologies are different.

The base station 11 and each base station 12 (or the two base stations 12) may be connected by way of wired connection (e.g., optical fibers compliant with a Common Public Radio Interface (CPRI) or an X2 interface) or radio connection.

The base station 11 and each base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each base station 12 may be connected with the higher station apparatus 30 via the base station 11.

In this regard, the base station 11 is a base station that has a relatively wide coverage, and may be referred to as a macro base station, an aggregate node, an eNodeB (eNB) or a transmission/reception point. Furthermore, each base station 12 is a base station that has a local coverage, and may be referred to as a small base station, a micro base station, a pico base station, a femto base station, a Home eNodeB (HeNB), a Remote Radio Head (RRH) or a transmission/reception point. The base stations 11 and 12 will be collectively referred to as a base station 10 below when not distinguished.

Each user terminal 20 is a terminal that supports various communication schemes such as LTE, LTE-A and 5G, and may include not only a mobile communication terminal (mobile station) but also a fixed communication terminal (fixed station).

The radio communication system 1 applies Orthogonal Frequency-Division Multiple Access (OFDMA) to downlink and applies at least one of Single Carrier-Frequency Division Multiple Access (SC-FDMA) and OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink control channel as downlink channels. User data, higher layer control information and a System Information Block (SIB) are conveyed on the PDSCH. Furthermore, a Master Information Block (MIB) is conveyed on the PBCH.

The downlink control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of at least one of the PDSCH and the PUSCH is conveyed on the PDCCH.

In addition, DCI for scheduling DL data reception may be referred to as a DL assignment, and DCI for scheduling UL data transmission may be referred to as a UL grant.

The number of OFDM symbols used for the PDCCH may be conveyed on the PCFICH. Transmission acknowledgement information (also referred to as, for example, retransmission control information, HARQ-ACK or ACK/NACK) of a Hybrid Automatic Repeat reQuest (HARQ) for the PUSCH may be conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

(Base Station)

Figure 3:
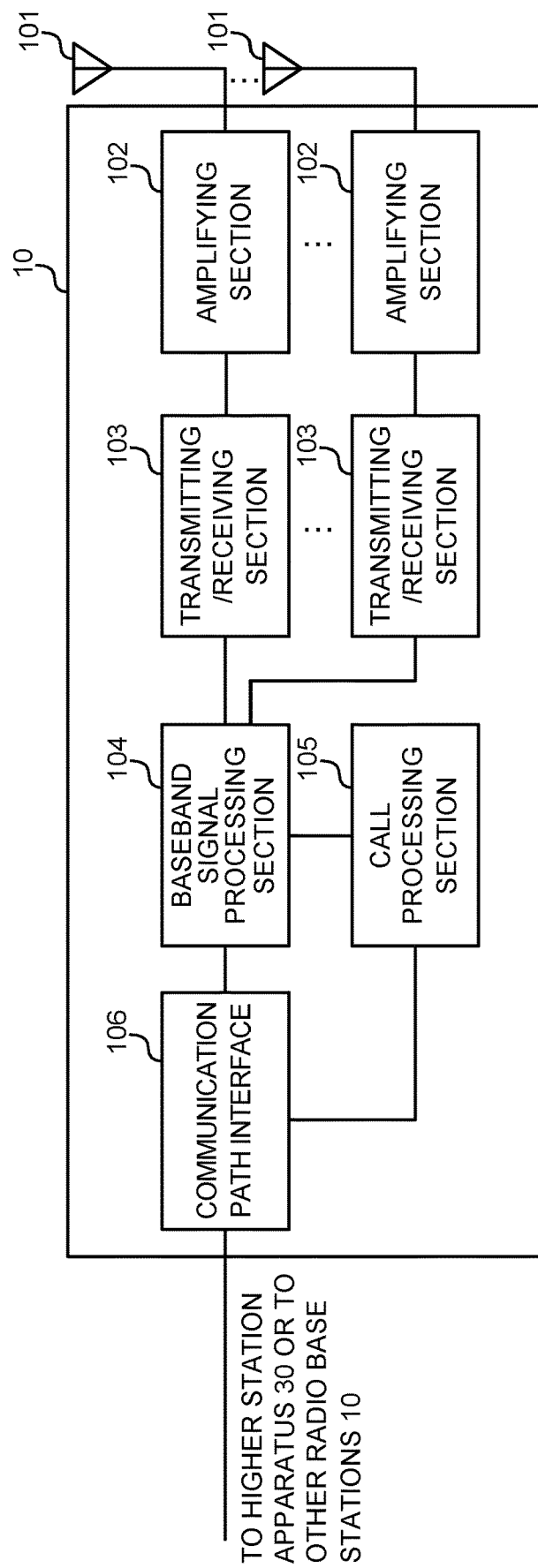
FIG. 3 is a diagram illustrating one example of an overall configuration of a base station according to the one embodiment.

FIG. 3 is a diagram illustrating one example of an overall configuration of the base station according to the one embodiment. The base station 10 includes pluralities of transmission/reception antennas 101, amplifying sections 102 and transmitting/receiving sections 103, a baseband signal processing section 104, a call processing section 105 and a communication path interface 106. In this regard, the base station 10 only needs to be configured to include one or more of each of the transmission/reception antennas 101, the amplifying sections 102 and the transmitting/receiving sections 103.

User data transmitted from the base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmission sections and reception sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the base station 10 and radio resource management.

The communication path interface 106 transmits and receives signals to and from the higher station apparatus 30 via a given interface. Furthermore, the communication path interface 106 may transmit and receive (backhaul signaling) signals to and from the another base station 10 via an inter-base station interface (e.g., optical fibers compliant with the Common Public Radio Interface (CPRI) or the X2 interface).

In addition, each transmitting/receiving section 103 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present disclosure. Furthermore, each transmission/reception antenna 101 can be composed of an array antenna, for example. Furthermore, each transmitting/receiving section 103 is configured to be able to apply single BF and multiple BF.

Each transmitting/receiving section 103 may transmit a signal by using a transmission beam, or receive a signal by using a reception beam. Each transmitting/receiving section 103 may transmit and/or receive a signal by using a given beam determined by a control section 301.

Each transmitting/receiving section 103 may receive and/or transmit various pieces of information described in each of the above embodiments from the user terminal 20 and/or to the user terminal 20.

Figure 4:
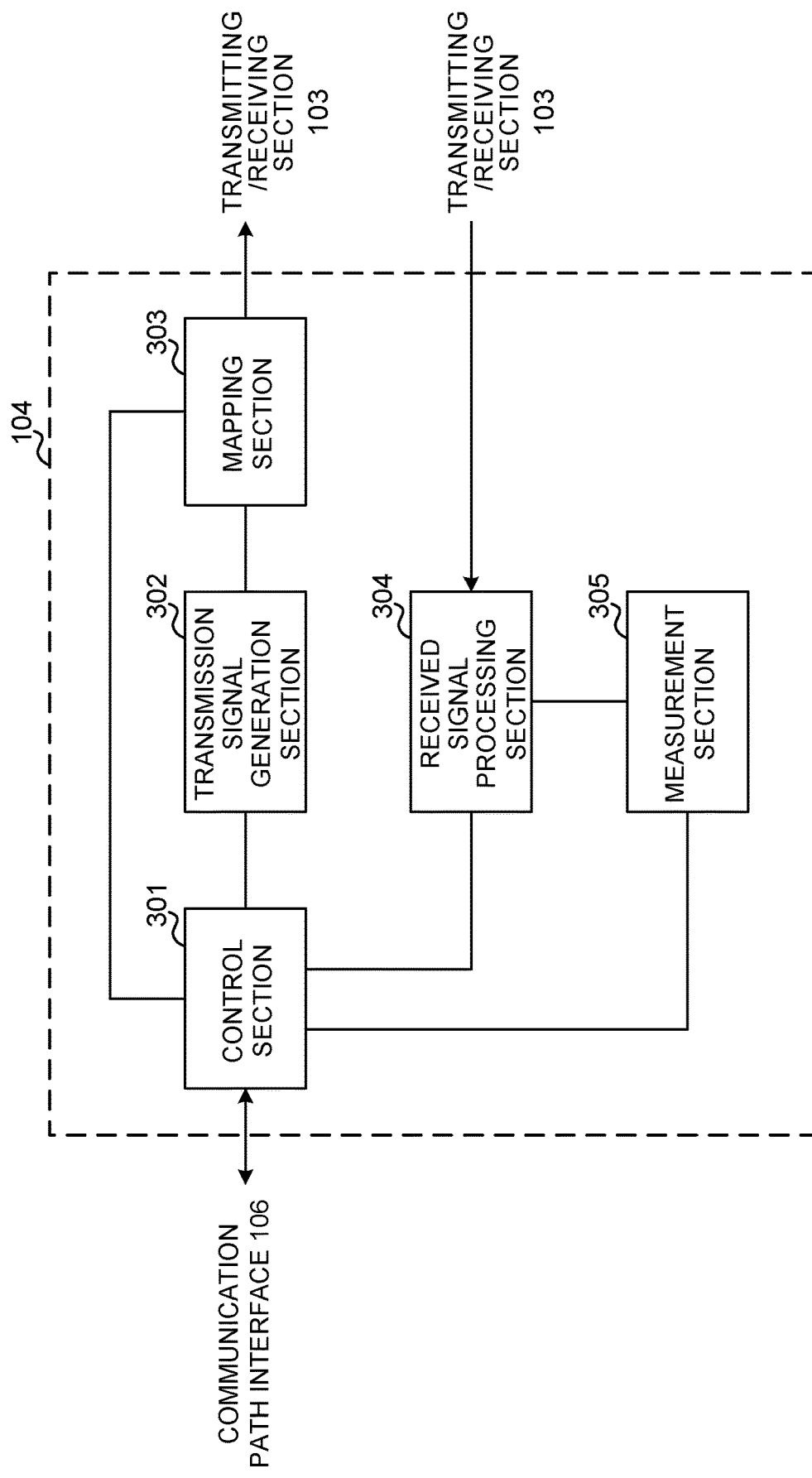
FIG. 4 is a diagram illustrating one example of a function configuration of the base station according to the one embodiment.

FIG. 4 is a diagram illustrating one example of a function configuration of the base station according to the one embodiment. In addition, this example mainly illustrates function blocks of characteristic portions according to the present embodiment, and may assume that the base station 10 includes other function blocks, too, that are necessary for radio communication.

The baseband signal processing section 104 includes at least the control section (scheduler) 301, a transmission signal generating section 302, a mapping section 303, a received signal processing section 304 and a measurement section 305. In addition, these components only need to be included in the base station 10, and part or all of the components may not be included in the baseband signal processing section 104.

The control section (scheduler) 301 controls the entire base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., PSS/SSS) and downlink reference signals (e.g., a CRS, a CSI-RS and a DMRS).

The control section 301 may perform control for forming a transmission beam and/or a reception beam by using digital BF (e.g., precoding) in the baseband signal processing section 104 and/or analog BF (e.g., phase rotation) in each transmitting/receiving section 103.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for giving notification of downlink data allocation information, and/or a UL grant for giving notification of uplink data allocation information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

In addition, each transmitting/receiving section 103 may transmit a transmission instruction of a reference signal for forming a spherical coverage to the user terminal 20. In addition, the reference signal may be an SRS, other reference signals, an arbitrary signal or channel, or a combination of these signals and channels.

In addition, each transmitting/receiving section 103 may transmit fallback Downlink Control Information (DCI) or non-fallback DCI for scheduling reception or transmission of a shared channel (e.g., a PDSCH or a PUSCH) to the user terminal 20. Each transmitting/receiving section 103 may receive or transmit a PTRS together with the shared channel.

The control section 301 may make a given assumption on the PTRS (on a PTRS density in particular) of the shared channel scheduled by the above fallback DCI or non-fallback DCI.

The control section 301 may assume that the PTRS of the shared channel scheduled by the fallback DCI is not present. The control section 301 may assume that the PTRS density of the shared channel scheduled by the fallback DCI is a given value.

The control section 301 may restrict at least one of a Modulation and Coding Scheme (MCS) index and a scheduled bandwidth indicated by the fallback DCI to a range of the given value.

The control section 301 may apply the given assumption only to a specific band (e.g., FR 2).

(User Terminal)

Figure 5:
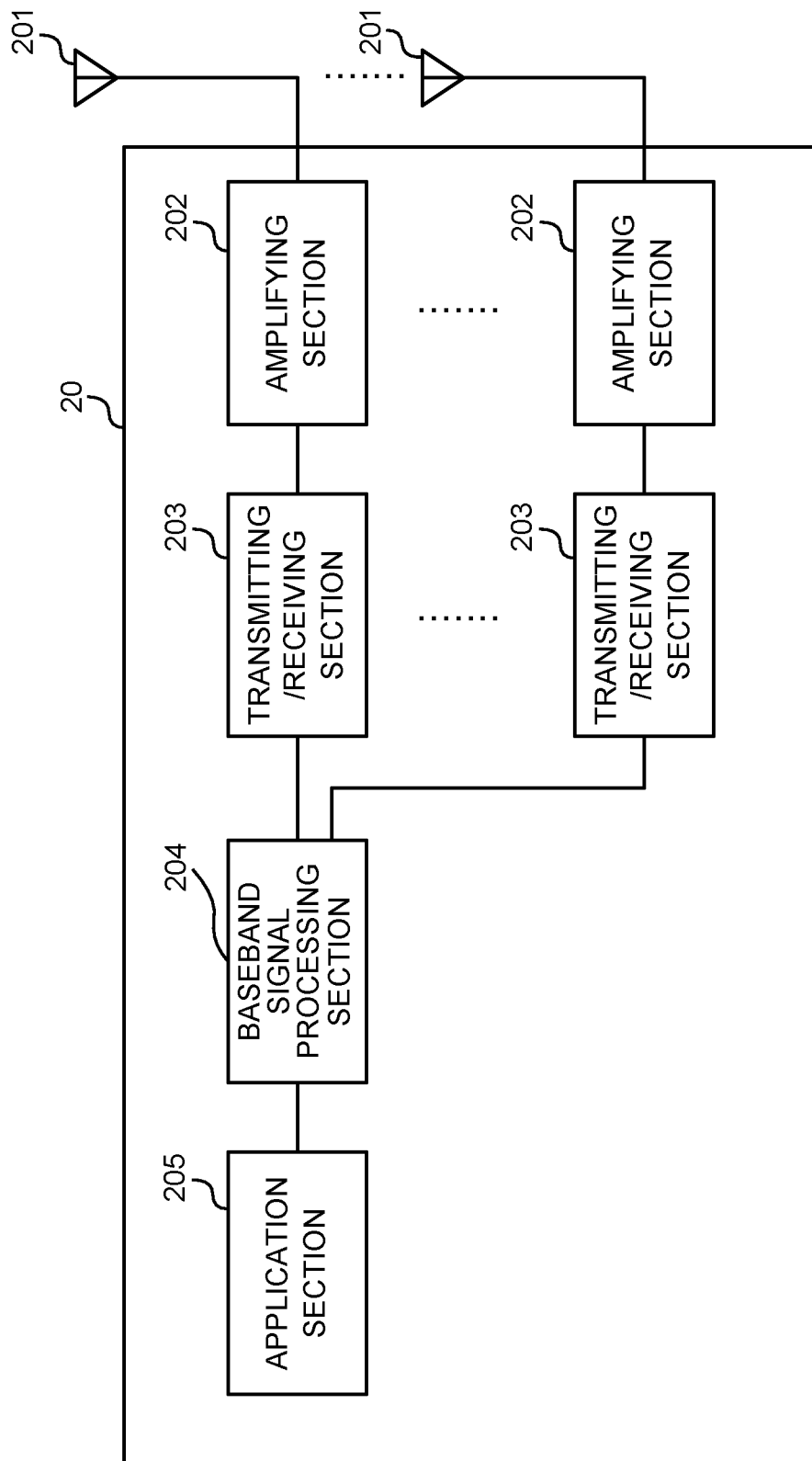
FIG. 5 is a diagram illustrating one example of an overall configuration of a user terminal according to the one embodiment.

FIG. 5 is a diagram illustrating one example of an overall configuration of the user terminal according to the one embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmission sections and reception sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Figure 6:
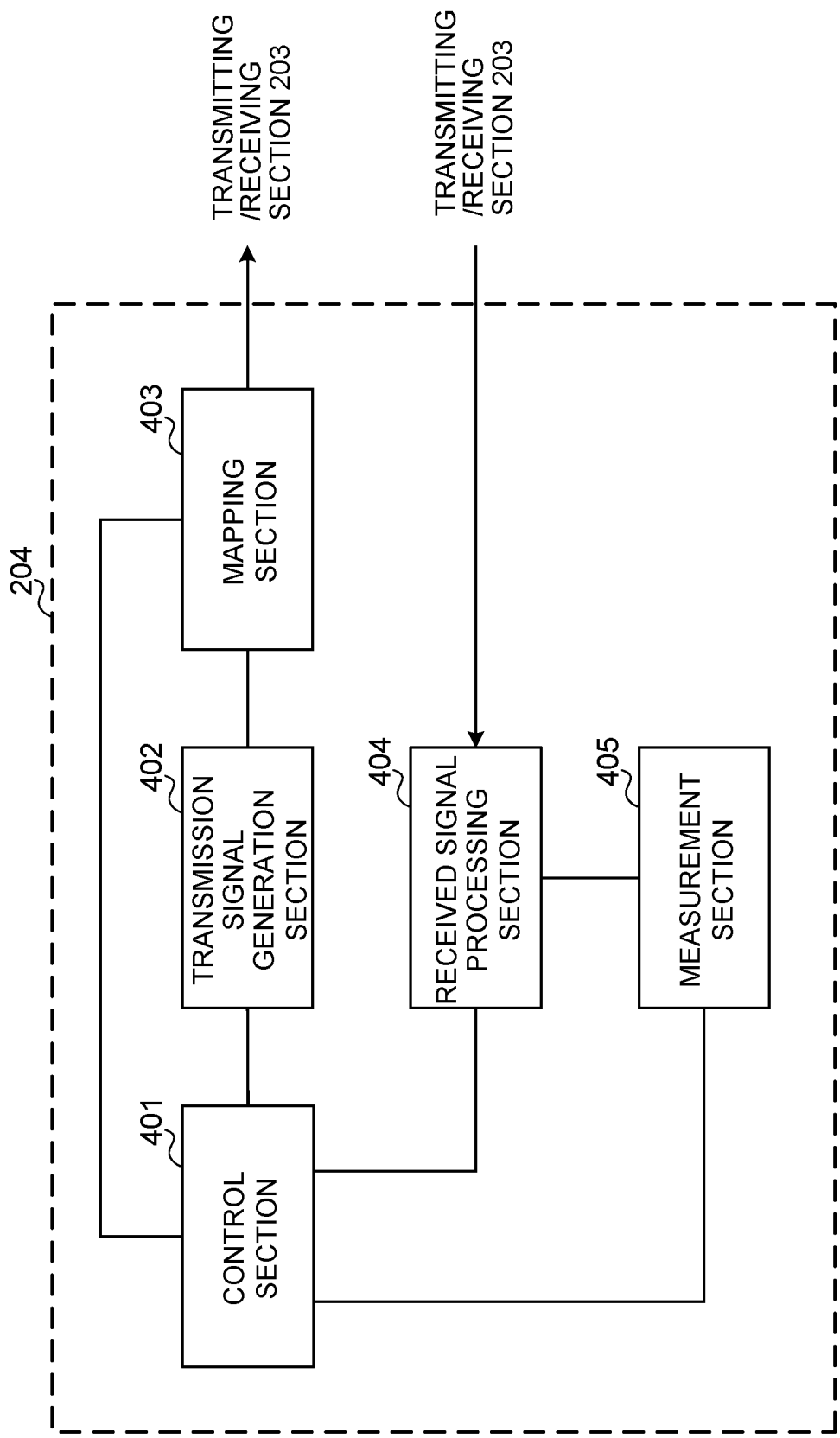
FIG. 6 is a diagram illustrating one example of a function configuration of the user terminal according to the one embodiment.

FIG. 6 is a diagram illustrating one example of a function configuration of the user terminal according to the one embodiment. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the base station 10. The control section 401 controls generation of an uplink control signal and/or an uplink data signal based on a result obtained by deciding whether or not it is necessary to perform retransmission control on the downlink control signal and/or the downlink data signal.

When obtaining from the received signal processing section 404 various pieces of information notified from the base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (CSI) based on the instruction from the control section 401. Furthermore, the transmission signal generating section 402 generates an uplink data signal based on the instruction from the control section 401. When, for example, the downlink control signal notified from the base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the base station 10. The received signal processing section 404 can be composed of a signal processor, a signal processing circuit or a signal processing apparatus described based on the common knowledge in the technical field according to the present disclosure. Furthermore, the received signal processing section 404 can compose the reception section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

In addition, each transmitting/receiving section 203 may receive or transmit the shared channel (e.g., the PDSCH or the PUSCH) based on the fallback Downlink Control Information (DCI) or the non-fallback DCI. Each transmitting/receiving section 203 may receive or transmit the PTRS together with the shared channel.

The control section 401 may make the given assumption on the PTRS (on the PTRS density in particular) of the shared channel scheduled by the above fallback DCI or non-fallback DCI.

The control section 401 may assume that the PTRS of the shared channel scheduled by the fallback DCI is not present. The control section 401 may assume that the PTRS density of the shared channel scheduled by the fallback DCI is the given value.

The control section 401 may assume that at least one of the Modulation and Coding Scheme (MCS) index and the scheduled bandwidth indicated by the fallback DCI is within the range of the given value.

The control section 401 may apply the given assumption only to the specific band (e.g., FR 2).

(Hardware Configuration)

In addition, the block diagrams used to describe the above embodiments illustrate blocks in function units. These function blocks (components) are realized by an arbitrary combination of at least one of hardware and software. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection). Each function block may be realized by combining software with the above one apparatus or a plurality of above apparatuses.

In this regard, the functions include judging, determining, deciding, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as a transmitting unit or a transmitter. As described above, the method for realizing each function block is not limited in particular.

Figure 7:
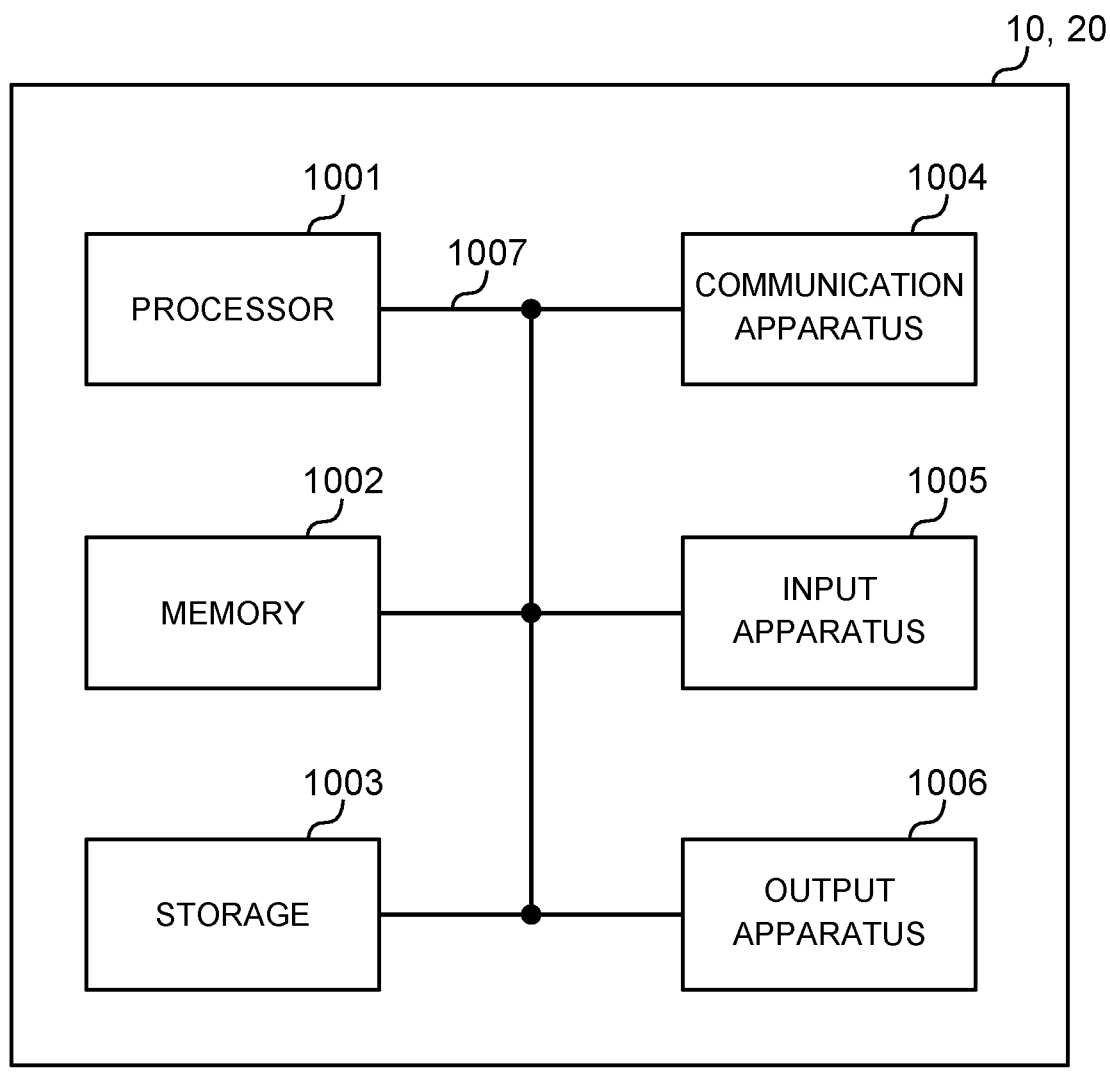
FIG. 7 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 7 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 7 or may be configured without including part of the apparatuses.

For example, FIG. 7 illustrates the only one processor 1001. However, there may be a plurality of processors. Furthermore, processing may be executed by 1 processor or processing may be executed by 2 or more processors concurrently or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above-described embodiments are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmission/reception antennas 101 (201), amplifying sections 102 (202), transmitting/receiving sections 103 (203) and communication path interface 106 may be realized by the communication apparatus 1004. Each transmitting/receiving section 103 (203) may be physically or logically separately implemented as a transmission section 103a (203a) and a reception section 103b (203b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, at least one of a channel and a symbol may be a signal (signaling). Furthermore, a signal may be a message. A reference signal can be also abbreviated as an RS (Reference Signal), or may be referred to as a pilot or a pilot signal depending on standards to be applied. Furthermore, a Component Carrier (CC) may be referred to as a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on the numerologies.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies.

The slot may include a plurality of mini slots. Each mini slot may include one or a plurality of symbols in the time domain. Furthermore, the mini slot may be referred to as a subslot. The mini slot may include a smaller number of symbols than those of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit for scheduling. Furthermore, the number of slots (the number of mini slots) that make up a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe, a long subframe or a slot. A TTI shorter than the general TTI may be referred to as a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a BWP for UL (UL BWP) and a BWP for DL (DL BWP). One or a plurality of BWPs in 1 carrier may be configured to the UE.

At least one of the configured BWPs may be active, and the UE may not assume that a given signal/channel is transmitted and received outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus, a reception apparatus or a radio communication apparatus. In addition, at least one of the base station and the mobile station may be a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flow-chart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods, or next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up, search and inquiry (e.g., looking up in a table, a database or another data structure), and ascertaining.

Furthermore, "deciding (determining)" may be regarded to "decide (determine)" receiving (e.g., receiving information), transmitting (e.g., transmitting information), input, output and accessing (e.g., accessing data in a memory).

Furthermore, "deciding (determining)" may be regarded to "decide (determine)" resolving, selecting, choosing, establishing and comparing. That is, "deciding (determining)" may be regarded to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends not to be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
   a receiving section that receives a downlink shared channel based on Downlink Control Information (DCI) format 1_0; and
   a control section that assumes, when a capability related to a density of a Phase Tracking Reference Signal (PTRS) is reported, that a PTRS for the downlink shared channel is not present or that a PTRS of a specific density for the downlink shared channel is present.

2. The terminal according to claim 1, wherein the control section assumes, when the capability is reported, that the PTRS for the downlink shared channel is not present or that the PTRS of the specific density for the downlink shared channel is present, in Frequency Range 2 (FR2).

3. A radio communication method of a terminal comprising:
receiving a downlink shared channel based on Downlink Control Information (DCI) format 1_0; and
assuming, when a capability related to a density of a Phase Tracking Reference Signal (PTRS) is reported, that a PTRS for the downlink shared channel is not present or that a PTRS of a specific density for the downlink shared channel is present.

4. A base station comprising:
a transmitting section that transmits, to a terminal, Downlink Control Information (DCI) format 1_0 that schedules a downlink shared channel; and
a control section that controls, when a capability related to a density of a Phase Tracking Reference Signal (PTRS) is reported from the terminal, not to transmit a PTRS for the downlink shared channel or to transmit a PTRS of a specific density for the downlink shared channel.

5. A system comprising:
a terminal that comprises:
a receiving section that receives a downlink shared channel based on Downlink Control Information (DCI) format 1_0; and
a first control section that assumes, when a capability related to a density of a Phase Tracking Reference Signal (PTRS) is reported, that a PTRS for the downlink shared channel is not present or that a PTRS of a specific density for the downlink shared channel is present; and
a base station comprises:
a transmitting section that transmits, to the terminal, the DCI format 1_0; and
a second control section that controls, when the capability is reported from the terminal, not to transmit the PTRS or to transmit the PTRS of the specific density.

* * * * *